US007529734B2

(12) United States Patent
Dirisala

(10) Patent No.: US 7,529,734 B2
(45) Date of Patent: May 5, 2009

(54) METHOD AND APPARATUS FOR FACILITATING A DATABASE QUERY USING A QUERY CRITERIA TEMPLATE

(75) Inventor: Siva K. Dirisala, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 522 days.

(21) Appl. No.: 10/986,638

(22) Filed: Nov. 12, 2004

(65) Prior Publication Data

US 2006/0106763 A1 May 18, 2006

(51) Int. Cl.
*G06F 17/30* (2006.01)
(52) U.S. Cl. ..................................... 707/3; 707/4; 707/5
(58) Field of Classification Search .................. 707/3–5
See application file for complete search history.

(56) References Cited

U.S. PATENT DOCUMENTS

| | | | | |
|---|---|---|---|---|
| 6,141,659 A | * | 10/2000 | Barker et al. ................ | 707/102 |
| 6,434,554 B1 | * | 8/2002 | Asami et al. ................... | 707/4 |
| 2004/0088647 A1 | * | 5/2004 | Miller et al. ................ | 715/500 |
| 2004/0098294 A1 | * | 5/2004 | Dean et al. ...................... | 705/8 |
| 2005/0114692 A1 | * | 5/2005 | Watson-Luke et al. ...... | 713/200 |
| 2006/0053152 A1 | * | 3/2006 | Hickey et al. ............... | 707/102 |
| 2006/0253463 A1 | * | 11/2006 | Wu et al. ...................... | 707/10 |
| 2007/0112727 A1 | * | 5/2007 | Jardine et al. .................. | 707/3 |
| 2007/0282581 A1 | * | 12/2007 | Mangino et al. ............... | 703/6 |
| 2008/0059950 A1 | * | 3/2008 | Seitz et al. .................. | 717/108 |

* cited by examiner

*Primary Examiner*—Christian P. Chace
*Assistant Examiner*—Kellye Buckingham
(74) *Attorney, Agent, or Firm*—Park, Vaughan & Fleming LLP

(57) ABSTRACT

One embodiment of the present invention provides a system that facilitates user queries to a database. During operation, the system stores one or more query criteria templates in a template table in the database. Each record in the template table corresponds to a query criteria template. A query criteria template contains information on search-field names and search-field values for a query. The system also allows a user to select a template from the stored templates prior to performing a query, thereby reducing the number of search-field values the user has to manually enter. In this way, a number of query criteria templates can be stored in a single table with a column containing parsable query criteria.

27 Claims, 9 Drawing Sheets

QUERY CRITERIA TEMPLATE TABLE 300

| TEMPLATE NAME | USER NAME | CREATION TIME | PRIVATE/ PUBLIC FLAG | QUERY CRITERIA |
|---|---|---|---|---|
| ACTIVE CAPITAL ITEMS | BOB | 10/2/2004 | PRIVATE | `<?xml version = '1.0' ?>`<br>`<query>`<br>`  <block name="MTL_SYSTEM_ITEMS_QF">`<br>`    <param name="INVENTORY_ITEM_STATUS_CODE" value="Active"/>`<br>`    <param name="ITEN_TYPE_DSP" value="Capital Item"/>`<br>`  </block>`<br>`</query>` |
| ... | | | | ... |

FIG. 3

METHOD AND APPARATUS FOR FACILITATING A DATABASE QUERY USING A QUERY CRITERIA TEMPLATE

BACKGROUND

1. Field of the Invention

The present invention relates to database management systems. More specifically, the present invention relates to a method and an apparatus for facilitating a database query using a query criteria template.

2. Related Art

The effectiveness of a database search largely depends on the quality of the search criteria entered by the user. Typically, a database application's user interface (UI) allows the user to enter values for a number of search fields to facilitate rapid identification of specific data records. However, this manual input process of these search-field values can be tedious and inefficient, especially if a user regularly conducts similar searches.

One approach to alleviate this problem is to allow users to create query criteria templates. Conventionally, query criteria templates are created using multiple tables. However, this multi-table structure can be inefficient and difficult to scale. For example, a query criteria template is typically implemented using a master-child table structure. A master table may contain a number of records, each record storing general header information of a query criteria template, such as template name and creation time. Every record in the master table is also associated with a child table, which contains names and values of search fields of a particular query criteria template. A child table stores the name and value of each field as a record, therefore a set of search criteria may require a large number of records. This can occupy a lot of storage space. In addition, a large number of templates can result in the added burden of managing the master table and the child tables, because reconstruction of a set of query criteria requires joining of a record in the master table with the records in a child table.

Hence, what is needed is a method and an apparatus for efficiently facilitating database queries using query criteria templates without storing the templates in multiple tables.

SUMMARY

One embodiment of the present invention provides a system that facilitates user queries to a database. During operation, the system stores one or more query criteria templates in a template table in the database. Each record in the template table corresponds to a query criteria template. A query criteria template contains information on search-field names and search-field values for a query. The system also allows a user to select a template from the stored templates prior to performing a query, thereby reducing the number of search-field values the user has to manually enter.

In a variation on this embodiment, storing the template in the template table involves storing a set of query criteria in a parsable format in a column. In this way, the system avoids storing search-field names and search-field values in separate records.

In a further variation, storing the query criteria in a parsable format in the column involves storing the query criteria in an XML file as a character large object (CLOB) or a binary large object (BLOB).

In a variation on this embodiment, storing the template in the template table involves storing a template name, a user name, a template creation time, or a public/private flag in one or more columns within the record corresponding to the template.

In a variation on this embodiment, the system receives a query to retrieve one or more templates selected by the user. In addition, the system retrieves a template selected by the user, and communicates the retrieved template to a middle-tier server or a client, thereby allowing the template to be parsed.

One embodiment of the present invention provides a system that facilitates user queries to a database. During operation, the system receives a set of query criteria created by a user through a user interface. The system then creates a query criteria template based on the received query criteria, wherein the query criteria template is a record which can be stored in a template table. Next, the system communicates the template to a database where the template can be stored in the template table.

In a variation on this embodiment, creating the query criteria template based on the received query criteria involves extracting search-field names, search-field data types, and search-field length from a set of user interface metadata, and representing the extracted search-field names and search-field values in a parsable format, which can be stored in a column of the record corresponding to the query criteria template.

In a further variation, representing the extracted search-field names and search-field values in a parsable format involves representing the extracted search-field names and search-field values in an XML file and storing the XML file as a CLOB or a BLOB.

In a variation on this embodiment, the system allows the user to specify a name for the created template and to specify the template to be private or public. A private template is only visible to the template's creator. A public template is visible to multiple users.

In a variation on this embodiment, the system queries the database to retrieve a user-selected template. The system then receives the user-selected template from the database. Next, the system parses the received template to obtain a set of query criteria, and populates a query form with search-field names and search-field values contained in the query criteria based on a set of user interface metadata.

BRIEF DESCRIPTION OF THE FIGURES

FIG. 3 illustrates an exemplary template table in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Database System

In general, database systems can have different architectures. In a conventional client-server architecture, a user submits commands and receives responses at a client while the database application resides at a server. With the increasing use of Internet, multi-tier database architectures are becoming more common. For example, a user can interact with a database system through a user interface (UI) located at a remote client (e.g., a web browser). The user interface communicates with a middle-tier server (also called application server), which in turn performs corresponding data submission or retrieval operations involving a backend database server. The middle-tier server is also responsible for relaying information from the database server to the user interface, which delivers the information to the user.

Figure 1:
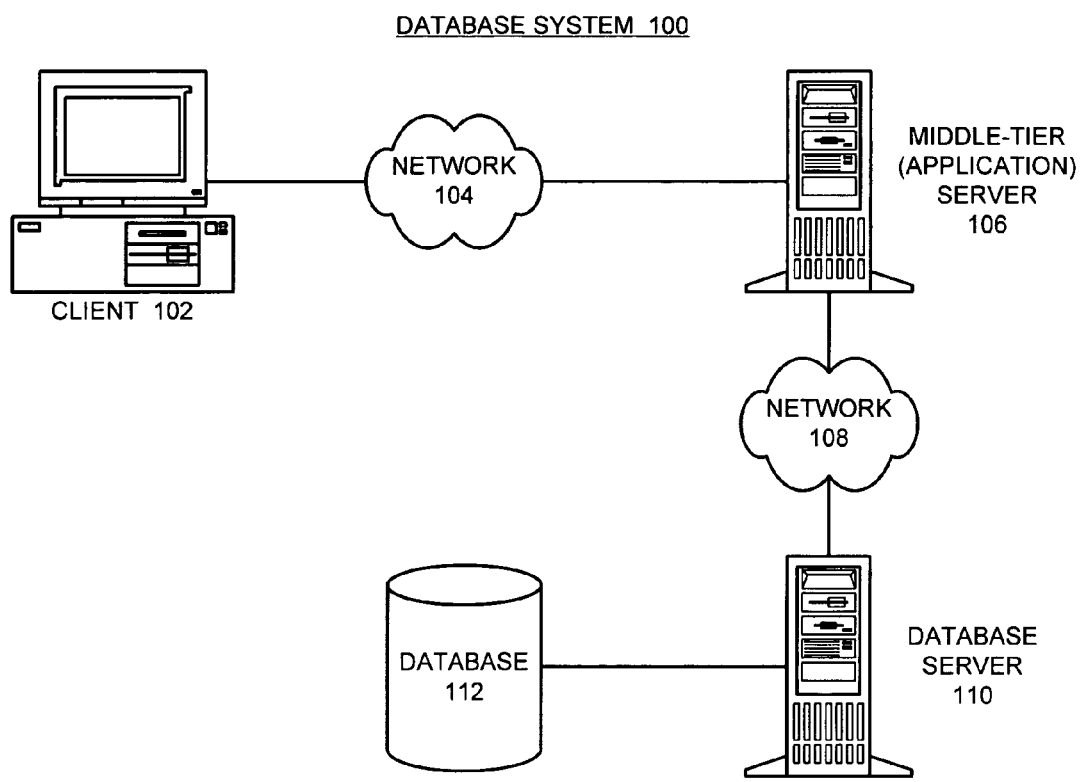
FIG. 1 illustrates a multi-tier database system in accordance with an embodiment of the present invention.

FIG. 1 illustrates a multi-tier database system in accordance with an embodiment of the present invention. As shown in FIG. 1, database system 100 includes client 102, middle-tier (application) server 106, database server 110, and database 112. Client 102 is coupled to middle-tier server 106 across network 104, while database server 110 is coupled to middle-tier server 106 across network 108. Database 112 is coupled to database server 110.

Networks 104 and 108 can generally include any type of wire or wireless communication channel capable of coupling together computing nodes. This includes, but is not limited to, a local area network, a wide area network, or a combination of networks. In one embodiment of the present invention, networks 104 and 108 include the Internet. Network 108 can also be a private network. Note that in some configurations middle-tier server 106 and database server 110 can be hosted by the same computer system.

Database 112 can include any type of system for storing data in non-volatile storage. This includes, but is not limited to, systems based upon magnetic, optical, and magneto-optical storage devices, as well as storage devices based on flash memory and/or battery-backed up memory. Database administrator 114 is responsible for the operation and maintenance of database 112, and typically has the privilege to modify data stored in the storage device.

Client 102 allows a user (not shown) to enter data through a user interface, such as a web browser. This data is sent to middle-tier server 106 across network 104. Middle-tier server 106 then forms a database query using the data supplied by client 102 and forwards this query to database server 110 across network 108. Database server 110 validates the query and, if valid, performs the requested operation on database 112.

Storing Query Criteria Template

Figure 2A:
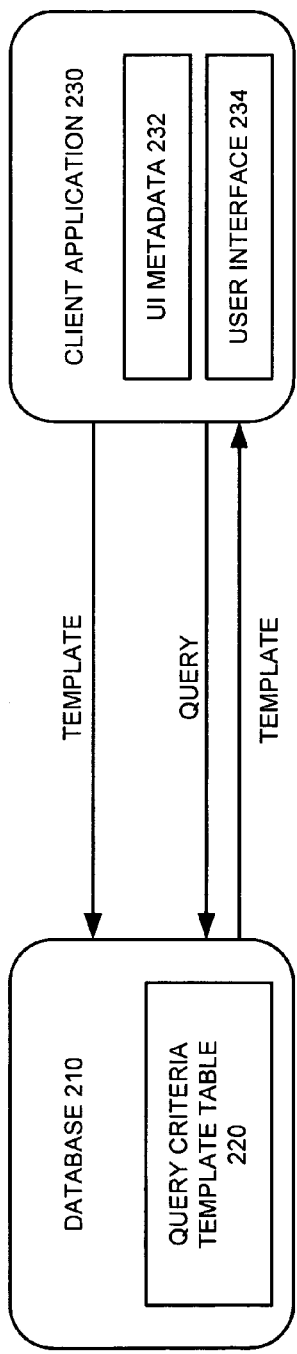
FIG. 2A illustrates the process of storing and retrieving a query criteria template in a database system employing a client-server architecture in accordance with an embodiment of the present invention.

FIG. 2A illustrates the process of storing and retrieving a query criteria template in a database system employing a client-server architecture in accordance with an embodiment of the present invention. During a query process, a user typically enters query criteria through a user interface 234, which is part of a client application 230. Client application 230 maintains a copy of user-interface (UI) metadata 232, which captures all the search fields of the query form.

When a user creates a new template, client application 230 generates the template based on UI metadata 232, and subsequently communicates the new template to a database 210. Database 210 maintains a query criteria template table 220. Upon receiving the newly created template from client application 230, database 210 inserts the template into table 220 as a single record.

When a user selects an existing template, client application 230 sends a query to template table 220. Database 210 in turn retrieves from template table 220 the selected template and sends the retrieved template back to client application 230. Client application 230 subsequently parses the received template and populates user interface 234 based on to UI metadata 232, thereby providing the user with search fields filled with previously saved values.

Figure 2B:
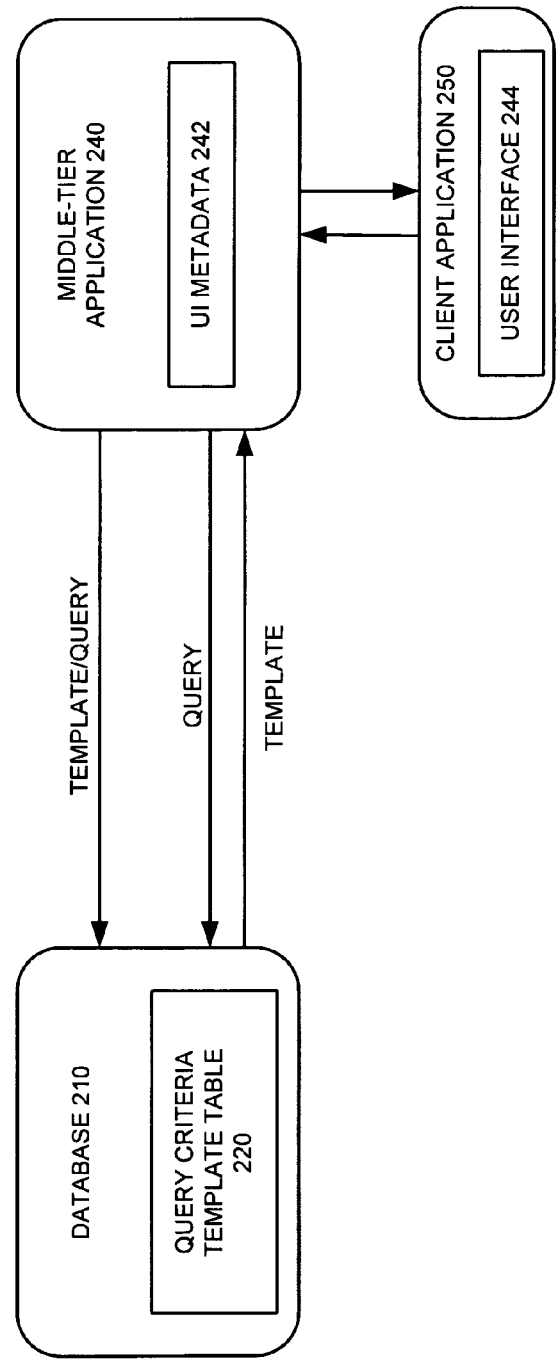
FIG. 2B illustrates the process of storing and retrieving a query criteria template in a database system employing a multi-tier architecture in accordance with an embodiment of the present invention.

FIG. 2B illustrates the process of storing and retrieving a query criteria template in a database system employing a multi-tier architecture in accordance with an embodiment of the present invention. During a query process, a user enters query criteria through a user interface 244, which is part of a client application 250. However, unlike the case in a client-server architecture, client application 250 does little more than providing user interface 244 and communicating all the information entered by the user to middle-tier application 240. Middle-tier application 240 maintains a copy of UI metadata 242, which captures all the search fields of the query form.

When a user creates a new template, middle-tier application 240 generates the template based on UI metadata 242, and subsequently communicates the new template to database 210. The template is then stored in template table 220 as a single record.

When a user selects an existing template, middle-tier application 240 receives a template name from the user through user interface 244. Middle-tier application 240 then sends a query to template table 220 with the template name. Database 210 in turn retrieves from template table 220 the selected template based on the template's name and sends the retrieved template back to middle-tier application 240. Middle-tier application 240 subsequently parses the received template and populates user interface 234 through client application 250 based on UI metadata 232.

FIG. 3 illustrates an exemplary template table in accordance with an embodiment of the present invention. As shown in FIG. 3, query criteria template table 300 includes a number of columns. A template is fully accommodated within one record within the table. Note that in this embodiment of the present invention, a single table can store an arbitrary number of templates. This solution is scalable because it allows simple management of all the templates from a single table as the number of templates grows larger.

In the example shown in FIG. 3, a record includes a template name ("Active Capital Items"), a user name ("Bob"), a creation time ("Oct. 2, 2004"), a private/public flag ("Private"), and a set of query criteria. Some of the columns are used to describe the query template's attributes, such as template name and name of the user who creates the template. Note that a user may specify a template to be public or private. A public template is visible to multiple users, whereas a private template is visible only to its creator.

Among the columns of a template record, at least one column is dedicated to the storage of the substantive query criteria (e.g., search field names and values). One embodiment of the present invention uses a large-object format to store the substantive information of the query in one single column. In the example shown in FIG. 3, the query criteria is stored in extensible markup language (XML) format. XML is a convenient way to represent query criteria, because of its flexibility in representing data objects, and because of its wide use today.

Another advantage of using XML is that an XML file can selectively store only search fields which have values entered by the user. Search fields without any user-entered values are not stored in the XML file. In this way, an XML file may save storage space and avoid storing search fields in separate records. Note that XML is not the only format to store query criteria in a column. Query criteria can be stored in any open or proprietary format, so long as the format is parsable.

The query criteria represented in a parsable format (e.g., XML) can be stored within a single column as a large object. For example, the XML file can be stored as a character large object (CLOB), or a binary large object (BLOB) stored in the query criteria column. This approach eliminates the need to use multiple tables.

Creating and Retrieving a Query Criteria Template

Figure 4:
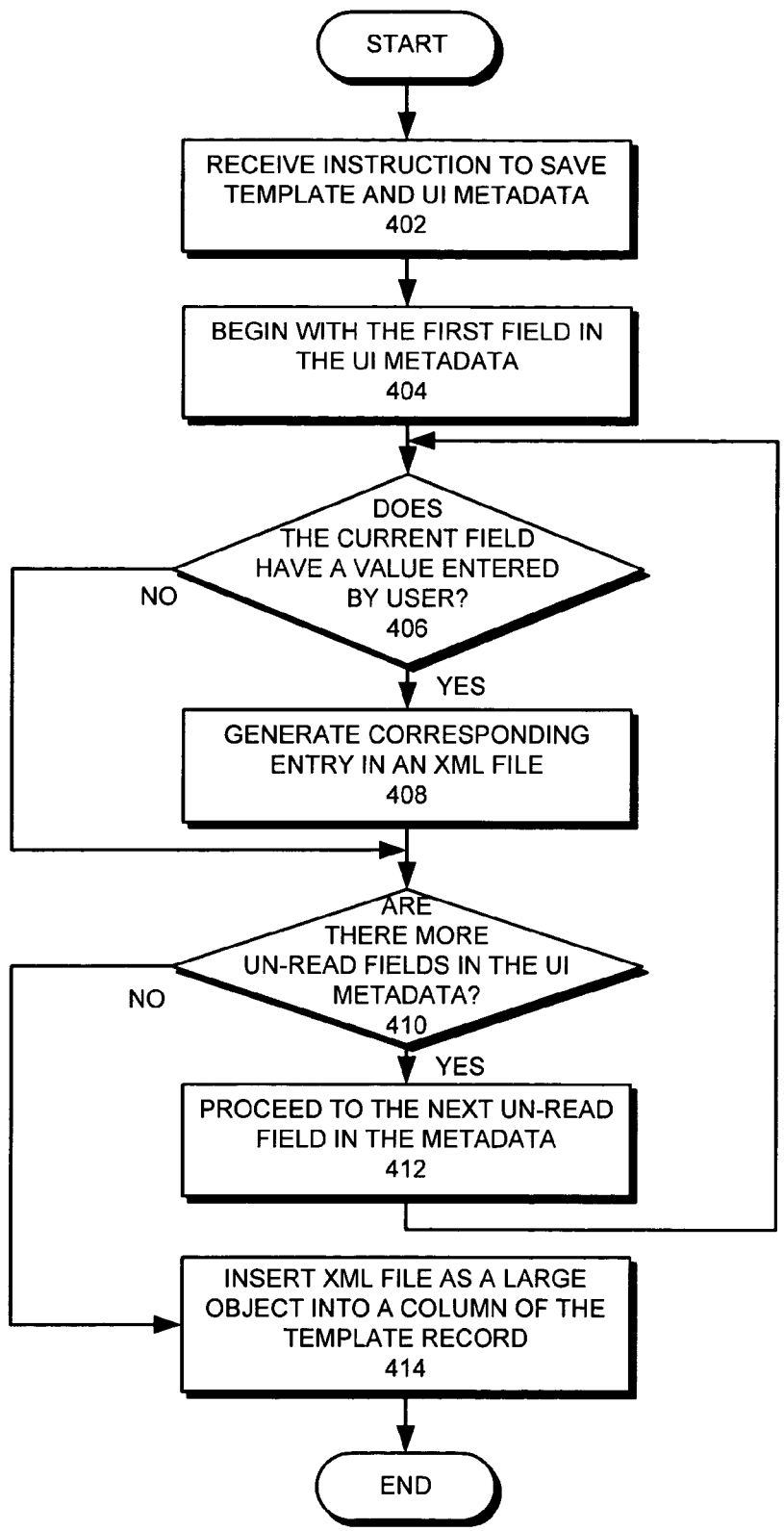
FIG. 4 presents a flowchart illustrating the process of creating a query criteria template based on user interface metadata in accordance with an embodiment of the present invention.

FIG. 4 presents a flowchart illustrating the process of creating a query criteria template based on user interface metadata in accordance with an embodiment of the present invention. Note that the template creation process can occur at a client in a client-server architecture, or at a middle-tier server in a multi-tier architecture. During operation, the system starts by receiving an instruction to save a new template and the corresponding UI metadata (step 402).

Note that UI metadata is user interface specific and typically includes all the search fields presented through the user interface. The UI metadata may include, for example, a search-field name, a search-field data type, and a search-field length. In addition, a search field may take multiple values or a range of values. For example, a search field such as "Introduction Date" may take a range of dates, while a field such as "Item Color" may take "White," "Black," and "Blue" as multiple-value input. Besides accommodating these types of multiple-value inputs and value-range inputs, the system ideally forms database queries accordingly using appropriate constructs, such as "introduction date between :date1 and :date2," or "item color in (:color1, :color2, :color3)."

Next, the system begins with the first search field in the UI metadata (step 404). The system then determines whether the current field has a value entered by the user (step 406). If so, the system generates a corresponding entry in the XML file which includes the field name and value (step 408). Otherwise, the system determines whether there are more un-read fields in the UI metadata (step 410). If so, the system proceeds to the next un-read field in the UI metadata (step 412) and repeats the entry-reading process (steps 406-410). Otherwise, the system concludes the reading of search fields in the UI metadata and inserts the XML file as a large object into a column of the template record (step 414).

Figure 5:
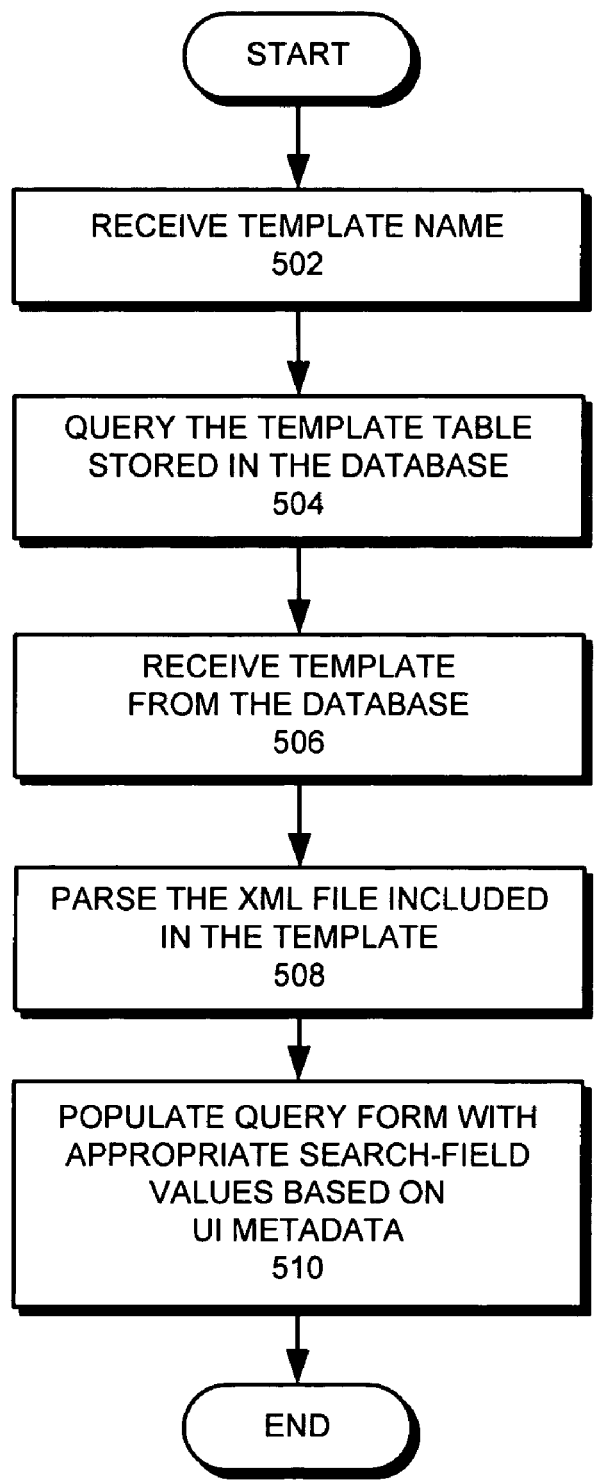
FIG. 5 presents a flowchart illustrating the process of retrieving and parsing a query criteria template based on user interface metadata in accordance with an embodiment of the present invention.

FIG. 5 presents a flowchart illustrating the process of retrieving and parsing a query criteria template based on user interface metadata in accordance with an embodiment of the present invention. Note that the template retrieval process can occur at a client in a client-server architecture, or at a middle-tier server in a multi-tier architecture. During operation, the system starts by receiving a template name from a user (step 502). Note that the user may enter or select the name of an existing template through the user interface. If the database system employs a multi-tier architecture, the user-selected template name is communicated to the middle-tier server from the client.

After receiving the template name, the system queries the template table stored in the database with the template name (step 504). The system then receives the selected template from the database in response of the query (step 506). Next, the system parses the query criteria column (e.g., an XML file as a large object) of the received template record (step 508). After obtaining the search fields with values previously saved by the user, the system populates the query form with appropriate search-field values through the user interface using a copy of the UI metadata which corresponds to the user interface (step 510).

Exemplary Implementation

Figure 6:
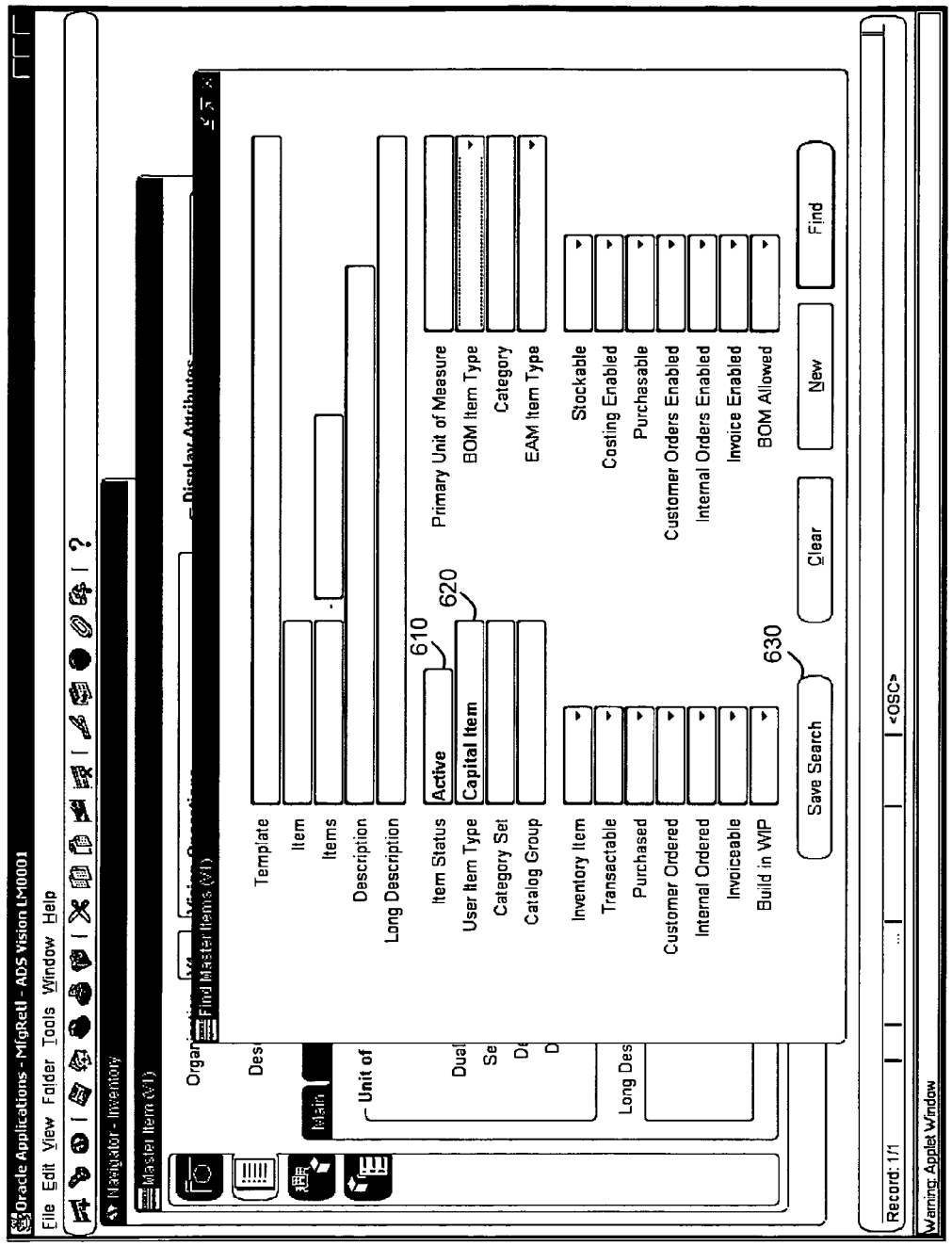
FIG. 6 illustrates a find window, which allows a user to enter values for different search fields and to save the current query in a template in accordance with an embodiment of the present invention.

FIG. 6 illustrates a find window, which allows a user to enter values for different search fields and to save the current query in a template in accordance with an embodiment of the present invention. In this example, the find window contains a number of search fields which allow a user to enter corresponding values. As shown in FIG. 6, field 610 is an "Item Status" field, for which a user enters the value "Active." Field 620 is a "User Item Type" field, for which the user enters the value "Capital Item." At the bottom of the window, there is a "Save Search" button 630, which allows the user to save the current search as a template.

Figure 7:
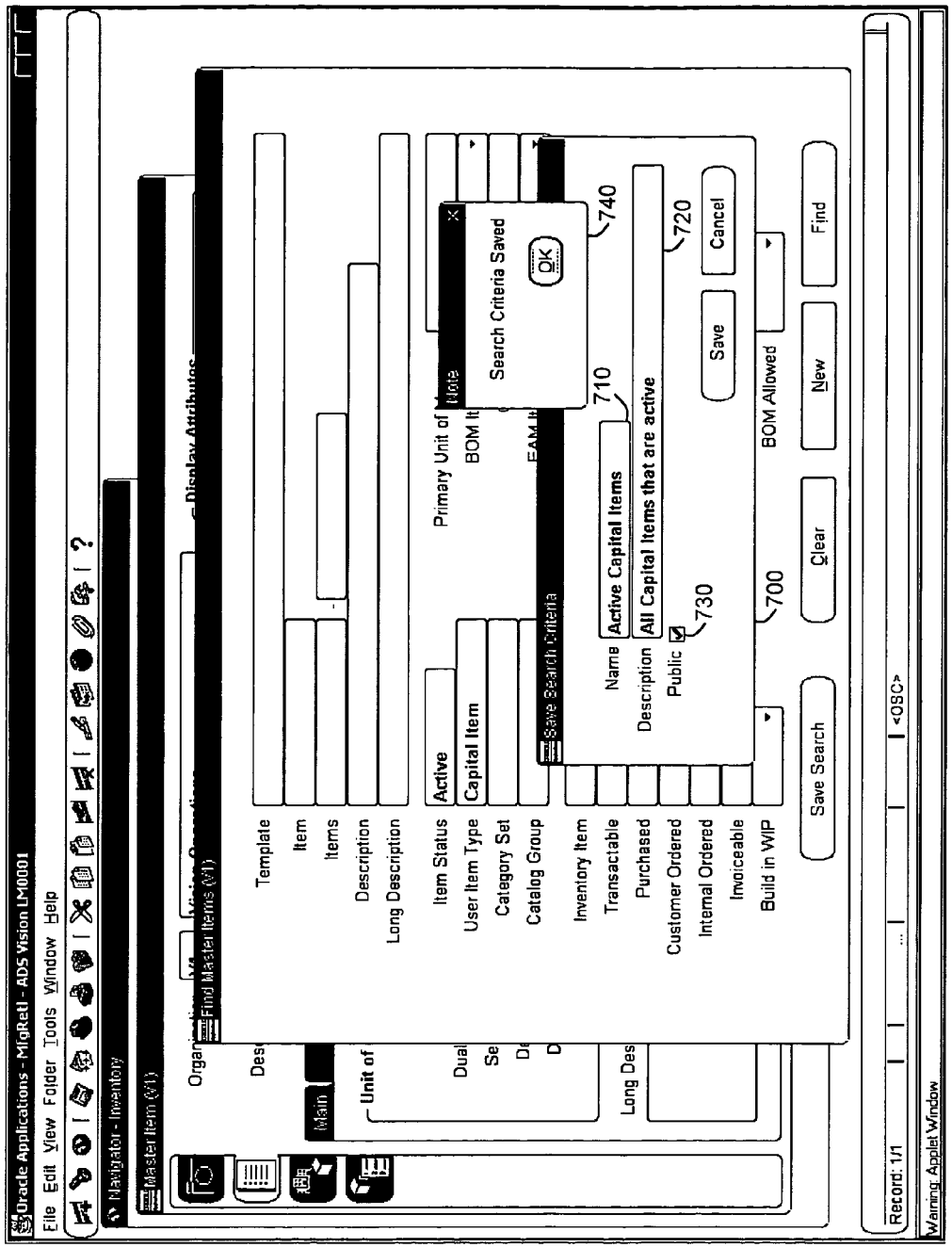
FIG. 7 illustrates a save window, which allows a user to specify a name, a description, and a private/public flag for the template to be saved in accordance with an embodiment of the present invention.

FIG. 7 illustrates a save window, which allows a user to specify a name, a description, and a private/public flag for the template to be saved in accordance with an embodiment of the present invention. In this example, template save window 700 contains a template name field 710, a template description field 720, and a private/public check box 730. Upon saving the template, the system may present a confirmation window 740 to the user to confirm successful saving of the template.

Figure 8:
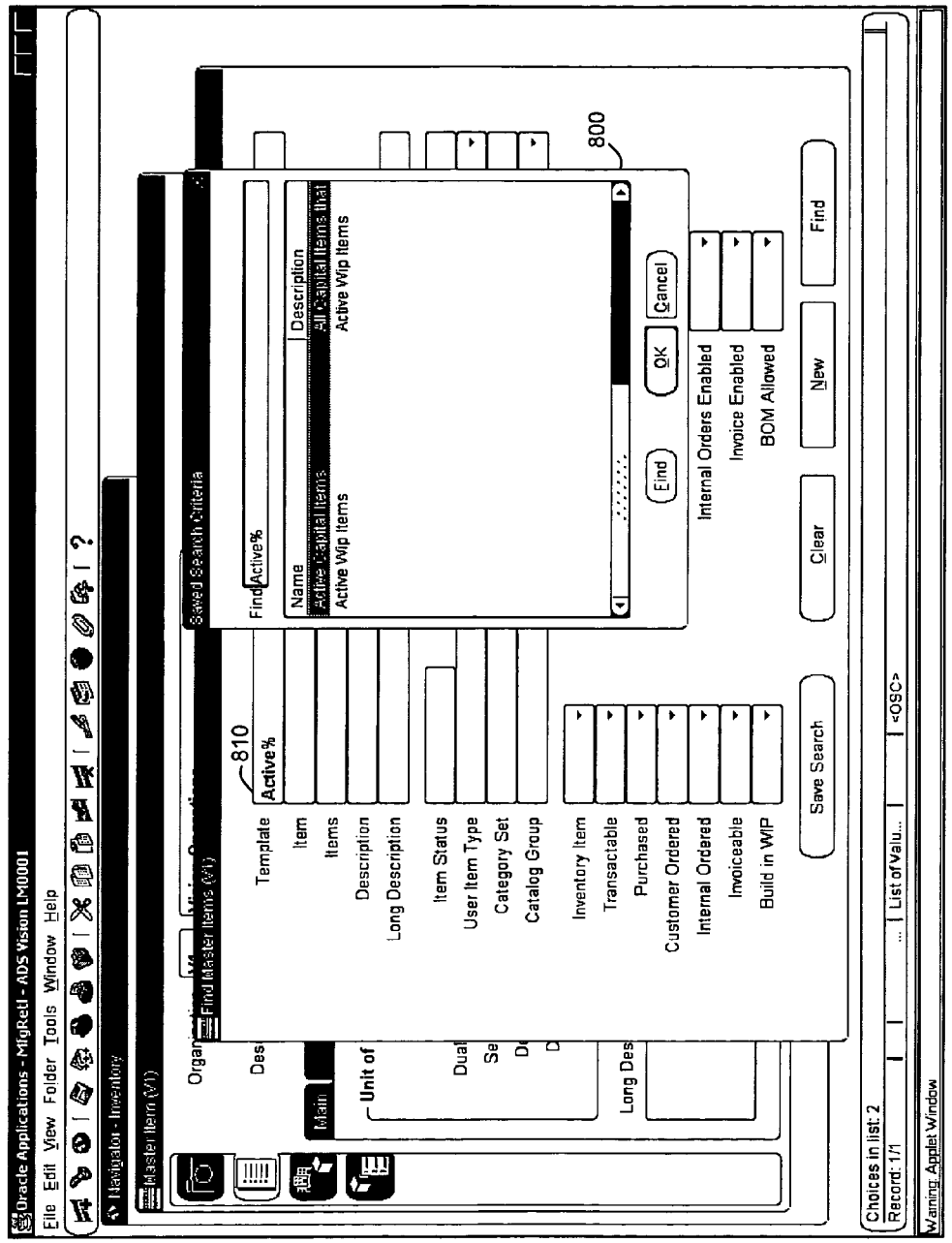
FIG. 8 illustrates a template selection window, which allows a user to enter part of a template name and to select from a list of matching templates in accordance with an embodiment of the present invention.

FIG. 8 illustrates a template selection window, which allows a user to enter part of a template name and to select from a list of matching templates in accordance with an embodiment of the present invention. After a user enters a name in a "template name" field 810 in the find window and issues a search for the matching templates, the system presents a template search window 800 which lists a number of matching templates. Note that the user may enter only part of the name and use a wild-card character (e.g., "%") to list multiple matching templates.

Figure 9:
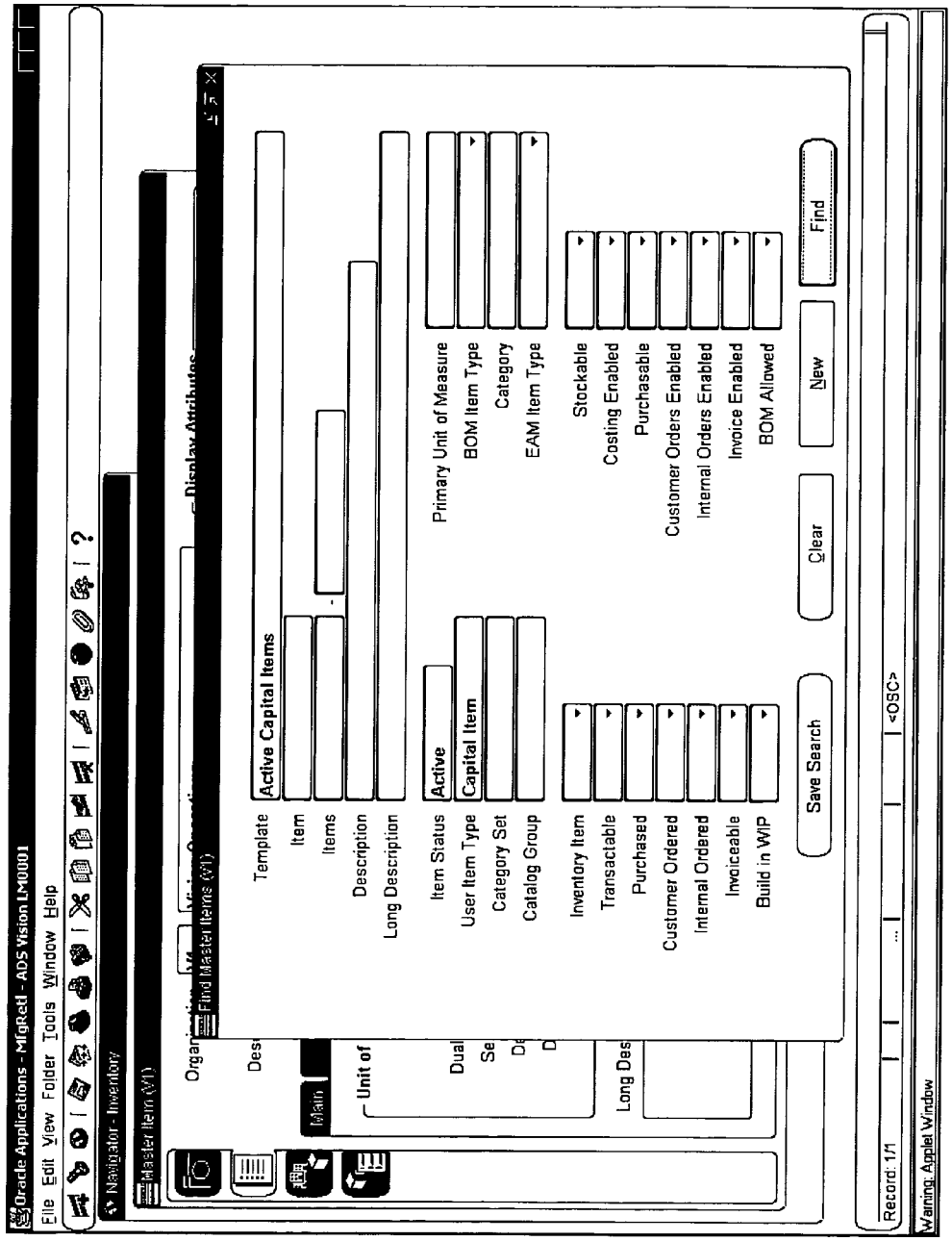
FIG. 9 illustrates a find window, which is populated based on an existing query criteria template in accordance with an embodiment of the present invention.

FIG. 9 illustrates a find window, which is populated based on an existing query criteria template in accordance with an embodiment of the present invention. As shown in this example, after a user selects a previously saved template, all the relevant search fields are automatically filled with the saved values. This allows the user to perform the search without manually entering these values.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating user queries to a database, comprising:
    determining one or more search fields from query criteria generated by a user in a client-side application;
    automatically generating one or more query criteria templates from the determined one or more search fields by
        extracting search-field names, search-field data types, and search-field length from a set of user interface metadata;
        obtaining search-field values from the one or more query criteria templates; and
        representing the search-field names and search-field values in an XML format which can be stored in a column of the record corresponding to the one or more query criteria templates;
    storing the one or more query criteria templates in a single template table in the database,
        wherein the query template table comprises rows and columns, and
        wherein each row in the query template table corresponds to a query criteria template and comprises one or more of template name, user name, creation time, and flag type corresponding to a specific query criteria template record, and
        wherein a query criteria template contains information on search-field names and search-field values for a query;
    populating a query form with appropriate search-field values; and
    allowing a user to select a template from the stored query criteria templates prior to performing a query, thereby reducing manual entry of search-field values for similar queries.

2. The method of claim 1, wherein storing the one or more query criteria templates in the template table involves storing a set of query criteria in a parsable format in a column, thereby avoiding storing search-field names and search-field values in separate records.

3. The method of claim 2, wherein storing the query criteria in a parsable format in the column involves storing the query criteria in an XML file as a character large object (CLOB) or a binary large object (BLOB).

4. The method of claim 1, wherein storing the one or more query criteria templates in the template table involves storing a template name, a user name, a template creation time, or a public/private flag in one or more columns within the record corresponding to the template.

5. The method of claim 1, further comprising:
    receiving a query to retrieve one or more templates selected by the user;
    retrieving a template selected by the user; and
    communicating the retrieved template to a middle-tier server or a client, thereby allowing the template to be parsed.

6. A method for facilitating user queries to a database, comprising:
    determining one or more search fields from query criteria generated by a user in a client-side application;
    automatically generating one or more query criteria templates from the determined one or more search fields by
        extracting search-field names, search-field data types, and search-field length from a set of user interface metadata;
        obtaining search-field values from the one or more query criteria templates; and
        representing the search-field names and search-field values in an XML format which can be stored in a column of the record corresponding to the one or more query criteria templates, wherein a query criteria template is a record which can be stored in a single template table,
        wherein the query template table comprises rows and columns, and
        wherein each row in the query template table corresponds to a query criteria template and comprises one or more of template name, user name, creation time, and flag type corresponding to a specific query criteria template record; and
    communicating the one or more query criteria templates to a database where the one or more query criteria templates can be stored in a template table.

7. The method of claim 1, wherein representing the search-field names and search-field values in a parsable format involves representing the extracted search-field names and search-field values in an XML file and storing the XML file as a CLOB or a BLOB.

8. The method of claim 1, further comprising allowing the user to specify a name for the automatically generated one or more query criteria templates and to specify the automatically generated one or more query criteria templates to be private or public; wherein
    a private template is only visible to the template's creator; and
    wherein a public template is visible to multiple users.

9. The method of claim 1, further comprising:
    querying the database to retrieve a user-selected template;
    receiving the user-selected template from the database;
    parsing the received template to obtain a set of query criteria; and
    populating a query form with search-field names and search-field values contained in the query criteria based on a set of user interface metadata.

10. A computer-readable storage medium storing instructions that when executed by a computer cause the computer to perform a method for facilitating user queries to a database, the method comprising:
    determining one or more search fields from query criteria generated by a user in a client-side application;
    automatically generating one or more query criteria templates from the determined one or more search fields by
        extracting search-field names, search-field data types, and search-field length from a set of user interface metadata;

obtaining search-field values from the query criteria; and representing the search-field names and search-field values in XML format which can be stored in a column of the record corresponding to the one or more query criteria templates;

storing the one or more query criteria templates in a single template table in the database, wherein the query template table comprises rows and columns, wherein each row in the query template table corresponds to a query criteria template and comprises one or more of template name, user name, creation time, and flag type corresponding to a specific query criteria template record, and wherein a query criteria template contains information on search-field names and search-field values for a query; and allowing a user to select a template from the stored templates prior to performing a query, thereby reducing manual entry of search-field values for similar queries.

11. The computer-readable storage medium of claim 10, wherein storing the one or more query criteria templates in the template table involves storing a set of query criteria in a parsable format in a column, thereby avoiding storing search-field names and search-field values in separate records.

12. The computer-readable storage medium of claim 11, wherein storing the query criteria in a parsable format in the column involves storing the query criteria in an XML file as a character large object (CLOB) or a binary large object (BLOB).

13. The computer-readable storage medium of claim 10, wherein storing the one or more query criteria templates in the template table involves storing a template name, a user name, a template creation time, or a public/private flag in one or more columns within the record corresponding to the template.

14. The computer-readable storage medium of claim 10, wherein the method further comprises:

receiving a query to retrieve one or more templates selected by the user;

retrieving a template selected by the user; and communicating the retrieved template to a middle-tier server or a client, thereby allowing the template to be parsed.

15. A computer-readable storage medium storing instructions that when executed by a computer cause the computer to perform a method for facilitating user queries to a database, the method comprising:

determining one or more search fields from query criteria generated by a user in a client-side application;

automatically generating one or more query criteria templates from the determined one or more search fields by extracting search-field names, search-field data types, and search-field length from a set of user interface metadata;

obtaining search-field values from the query criteria; and representing the search-field names and search-field values in XML format which can be stored in a column of the record corresponding to the one or more query criteria templates, wherein a query criteria template is a record which can be stored in a single template table;

wherein the query template table comprises rows and columns, and wherein each row in the query template table corresponds to a query criteria template and comprises one or more of template name, user name, creation time, and flag type corresponding to a specific query criteria template record; and communicating the one or more query criteria templates to a database where the one or more query criteria templates can be stored in a template table.

16. The computer-readable storage medium of claim 15, wherein representing the search-field names and search-field values in a parsable format involves representing the extracted search-field names and search-field values in an XML file and storing the XML file as a CLOB or a BLOB.

17. The computer-readable storage medium of claim 15, wherein the method further comprises allowing the user to specify a name for the automatically generated one or more query criteria templates and to specify the automatically generated one or more query criteria templates to be private or public;

wherein a private template is only visible to the template's creator; and wherein a public template is visible to multiple users.

18. The computer-readable storage medium of claim 15, wherein the method further comprises:

querying the database to retrieve a user-selected template;

receiving the user-selected template from the database;

parsing the received template to obtain a set of query criteria; and populating a query form with search-field names and search-field values contained in the query criteria based on a set of user interface metadata.

19. An apparatus for facilitating user queries to a database, comprising:

a processor;

a memory;

a database;

a determining mechanism configured to determine one or more search fields from query criteria generated by a user in a client-side application;

a template-generating mechanism configured to automatically generate one or more query criteria templates from the determine one or more search fields by extracting search-field names, search-field data types, and search-field length from a set of user interface metadata;

obtaining search-field values from the query criteria; and representing the search-field names and search-field values in an XML format which can be stored in a column of the record corresponding to the one or more query criteria templates;

a storage mechanism configured to store the one or more query criteria templates in a single template table in the database, wherein the query template table comprises rows and columns, wherein each row in the query template table corresponds to a query criteria template and comprises one or more of template name, user name, creation time, and flag type corresponding to a specific query criteria template record, and wherein a query criteria template contains information on search-field names and search-field values for a query;

a populating mechanism configured to populate a query form with appropriate search-field values; and a selection mechanism configured to allow a user to select a template from the stored templates prior to performing a query, thereby reducing manual entry of search-field values for similar queries.

20. The apparatus of claim 19, wherein while storing the one or more query criteria templates in the template table, the storage mechanism is configured to store a set of query criteria in a parsable format in a column, thereby avoiding storing search-field names and search-field values in separate records.

21. The apparatus of claim 20, wherein while storing the query criteria in a parsable format in the column, the storage mechanism is configured to store the query criteria in an XML file as a character large object (CLOB) or a binary large object (BLOB).

22. The apparatus of claim 19, wherein while storing the one or more query criteria templates in the template table, the storage mechanism is configured to store a template name, a user name, a template creation time, or a public/private flag in one or more columns within the record corresponding to the template.

23. The apparatus of claim 19, further comprising:
a receiving mechanism configured to receive a query to retrieve one or more templates selected by the user;
a retrieval mechanism configured to retrieve a template selected by the user; and
a communication mechanism configured to communicate the retrieved template to a middle-tier server or a client, thereby allowing the template to be parsed.

24. The apparatus of claim 23, wherein while representing the search-field names and search-field values in a parsable format, the template-generating mechanism is configured to represent the extracted search-field names and search-field values in an XML file and to store the XML file as a CLOB or a BLOB.

25. An apparatus for facilitating user queries to a database, comprising:
a processor;
a memory;
a database;
a determining mechanism configured to determine one or more search fields from query criteria generated by a user in a client-side application;
a template-generating mechanism configured to automatically generate one or more query criteria templates from the determined one or more search fields by extracting search-field names, search-field data types, and search-field length from a set of user interface metadata;
obtaining search-field values from the query criteria; and
representing the search-field names and search-field values in a an XML format which can be stored in a column of the record corresponding to the one or more query criteria templates, wherein a query criteria template is a record which can be stored in a single template, table,
wherein the query template table comprises rows and columns, and wherein each row in the query template table corresponds to a query criteria template and comprises one or more of template name, user name, creation time, and flag type corresponding to a specific query criteria template record; and
a communication mechanism configured to communicate the one or more query criteria templates to a database where the one or more query criteria templates can be stored in the template table.

26. The apparatus of claim 25, wherein the template-generating mechanism is configured to allow the user to specify a name for the automatically generated templates and to specify the automatically generated one or more query criteria templates to be private or public;
wherein a private template is only visible to the template's creator; and
wherein a public template is visible to multiple users.

27. The apparatus of claim 25, further comprising:
a query mechanism configured to query the database to retrieve a user-selected template;
a second receiving mechanism configured to receive the user-selected template from the database;
a parsing mechanism configured to parse the received user-selected template to obtain a set of query criteria; and
a query-populating mechanism configured to populate a query form with search-field names and search-field values contained in the query criteria based on a set of user interface metadata.

* * * * *

UNITED STATES PATENT AND TRADEMARK OFFICE
CERTIFICATE OF CORRECTION

PATENT NO. : 7,529,734 B2  Page 1 of 1
APPLICATION NO. : 10/986638
DATED : May 5, 2009
INVENTOR(S) : Siva K. Dirisala It is certified that error appears in the above-identified patent and that said Letters Patent is hereby corrected as shown below:

In column 8, line 49, in claim 9, delete "1," and insert -- 6, --, therefor.

In column 9, line 4, in claim 10, before "XML" insert -- an --.

In column 9, line 60, in claim 15, before "XML" insert -- an --.

In column 12, line 8, in claim 25, after "in" delete "a".

In column 12, line 11, in claim 25, delete "template," and insert -- template --, therefor.

Signed and Sealed this

Twenty-fifth Day of May, 2010

David J. Kappos
*Director of the United States Patent and Trademark Office*